Aug. 19, 1924.
F. T. GAUSE
Re. 15,893
TIRE CHAIN
Original Filed Nov. 25, 1921
Fig. 1,
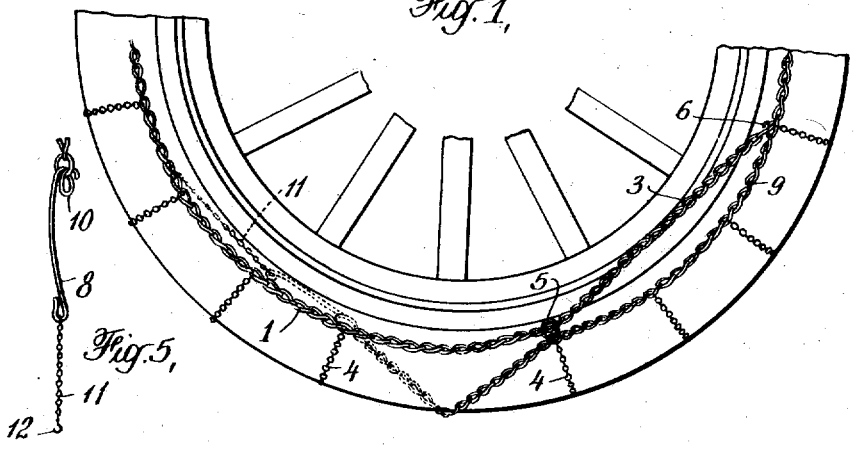
Fig. 5,
Fig. 2,
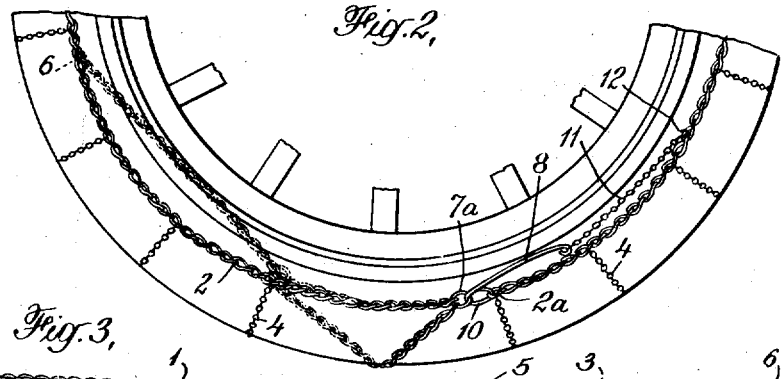
Fig. 3,
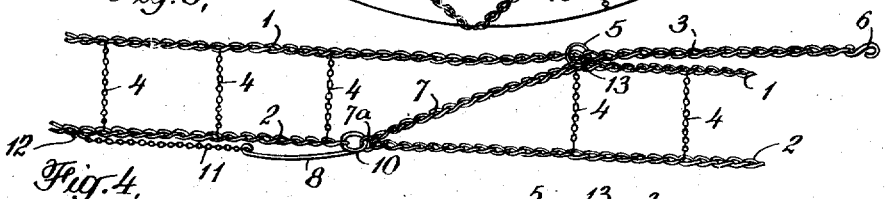
Fig. 4,
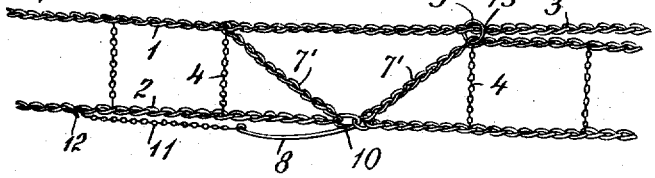
Frederick Taylor Gause
INVENTOR
BY
Pennie, Davis, Marvin & Edmonds
his ATTORNEYS Reissued Aug. 19, 1924. Re. 15,893

UNITED STATES PATENT OFFICE.

FREDERICK TAYLOR GAUSE, OF WILMINGTON, DELAWARE.

TIRE CHAIN.

Original No. 1,434,111, dated October 31, 1922, Serial No. 517,515, filed November 25, 1921. Application for reissue filed April 24, 1924. Serial No. 708,831.

*To all whom it may concern:*

Be it known that I, FREDERICK TAYLOR GAUSE, a citizen of the United States, residing at Wilmington, in the county of New Castle, State of Delaware, have invented certain new and useful Improvements in Tire Chains; and I do hereby declare the following to be a full, clear, and exact description of the invention, such as will enable others skilled in the art to which it appertains to make and use the same.

The present invention relates to tire chains used in connection with automobiles or other pneumatic tired vehicles for preventing skidding of the vehicle and increasing the tractive grip of the tires.

Tire chains as now commonly constructed comprise a pair of side chains with hooks or other fastenings in their ends and a series of cross chains connecting the two side chains at intervals of five or six inches. The side chains are of a length such that when their ends are hooked together they form rings of slightly greater circumference than the wheel rim and lie symmetrically on opposite sides of the tire.

In putting chains of this character on the wheel it is necessary to lay them out in line with the wheels and move the vehicle so that the wheels rest properly upon the cross chains, after which the ends of the side chains are drawn up over the wheels and secured together. It is frequently diffcult to bring the ends of the side chains together due to the slack caught under the vehicle wheel, or other cause, and even after one side chain has been hooked it is very commonly difficult to draw the ends of the other side chain together by hand and hook them.

To put on chains of this character there is necessarily a great deal of handling of the chain and reaching through and around the wheel, which is always a tedious and dirty job. Since tire chains are noisy and somewhat injurious to the tire they are invariably carried in the vehicle and put on the tire only when necessary, frequently after rain has started and the road has become muddy. These conditions add to the inconvenience of applying the chains and consequently compel the driver to remain outside the car for a longer time.

It is accordingly an object of the present invention to provide a tire chain which may be readily put on the tire without moving the vehicle on to the cross chains.

It is also an object of the present invention to provide a tire chain which may be easily applied to the tire and secured in place with a minimum amount of handling and reaching around the wheel.

A further object is to provide a tire chain in which the proper tension between the free ends of the side chains is conveniently secured and is maintained until the user desires to remove the chain, at which time the chain may be loosened and removed in any easy and convenient manner.

I have illustrated a preferred embodiment of my invention in the accompanying drawings; in which Figure 1 is an elevational view of the inside of a portion of a vehicle wheel provided with my improved tire chain; Fig. 2 is a similar view showing the outside of the wheel; Fig. 3 is a detail view illustrating my improved chain; Fig. 4 is a similar view showing a modification; and Fig. 5 illustrates a preferred form of fastening member.

Referring to the drawings, and particularly to Fig. 3, 1 and 2 indicate, respectively, the two side chains, and 4 the cross chains comprising an ordinary tire chain of the type commonly used on automobile wheels, and the like. The chain 1 is preferably of a length greater than is necessary to surround the wheel when the tire chain is in place, the excess length preferably having the form of an extension 3, which may be one-fifth to one-quarter the length of the side chain so as to extend well beyond the point where the ends of the chain are joined. A hook 6, or some other suitable fastening, is provided at the free end of the extension 3 for engagement with the body portion of the side chain 1, as will be later described.

The other end of the side chain 1 is provided, preferably at its juncture with the last cross chain 4, with a ring 5 large enough to slip freely over the extension 3 provided at the other extremity of the side chain 1. Beyond the ring 5 and the juncture with the last cross chain 4, the end 7 of the side chain is extended across to the adjacent end of the side chain 2 which is extended beyond the point of attachment of the last cross chain 4, the ends of the two side chains being of such relative length that when connected together and laid out flat, as shown in Fig. 3, the extension 7 forms the hypothenuse of the right triangle, whose two legs are the last cross chain 4 and the extending end of the side chain 2. The end of the side chain 2 and the adjacent end of the extension 7 are joined together as the apex of the triangle by means of a common link or ring 7ª preferably of a size somewhat larger than the other links of the side chain so that it may be conveniently employed in securing the free ends of the side chain 2 together when the chain has been placed in position upon the tire.

In applying my improved tire chain to an automobile or similar wheel, the chain is first laid upon the tire in such manner that the middle of the chain falls approximately at the top of the tire with the ends of the chain lying on the ground in front of and behind the point of contact of the wheel and the pavement. The side chain 1 is placed on the inside with the extension 3 toward the front of the vehicle when the chain is applied to the rear wheel. The body of the chain is then settled into place around the larger portion of the periphery of the wheel, whereupon the extension 3 of the side chain 1 may be conveniently grasped at its position in advance of the wheel and tossed backward on the inside of the wheel so that its end 6 may easily be reached from behind the wheel and slipped into its position through the ring 5. A pull exerted on the extension 3 will then pull up the side chain 1 into proper tension, the lowest cross chains 4 being normally at a sufficient distance apart so that this operation may be easily and conveniently performed, even though the bottom of the tire be resting upon soft or muddy ground. After the side chain 1 has been pulled up into a sufficiently taut condition it is retained in position by hooking the member 6, provided on the extremity of the extension 3, into one of the links along the side chain 1. The ring 7ª which is provided to connect the adjacent extremities of the side chain 2 and the cross extension 7 of the side chain 1, is lying at the rearward side of the wheel and at the outside of it, in which position it is readily accessible for connection to the other end of the side chain 2 for securely fastening the entire chain upon the wheel.

The connection between the free ends of the side chain 2 may be accomplished in any desirable manner, but I preferably employ for the purpose a fastening member such as shown in Fig. 5, consisting of a rod or heavy wire 8 slightly curved throughout the greater portion of its length, as shown, and provided at one end with a double loop 10. The loop 10 consists of a portion of the end of the wire 8 bent up into a spiral or helical form of approximately the size of a link of chain, the loop preferably having about one and one-half complete turns so as to provide a loop and a hook at the outer end of the rod. The other end of the rod 8 is provided with a length of light chain 11 which may be provided at its extremity with a hook 12 adapted to be caught into a link of the side chain 2. The fastening member 8 may be carried apart from the tire chain, if desired, but I preferably arrange the bent part 10 to be permanently associated with the end 2ª of the side chain 2. When in this position the chain 11 provided at the extremity of the rod 8 is threaded through the connecting link 7ª and the adjacent end of the rod 8 also brought through the ring. A turning force is then exerted on the end of the rod 8 and the adjacent ends of the chain will be drawn together by the lever action which is obtained through the rod 8. It is to be noted that as the ends of the chain are brought closer together, the ring 7ª slides down the rod 8 and the leverage constantly increases so that a very considerable tension can be applied between the adjacent chain ends without undue exertion on the part of the operator. After the rod 8 has been turned into position substantially parallel with the extent of the side chain, the loop portion 10 will lie between the end links of the side chain 2 and form in effect a connecting link between them. The hook 12 provided at the free end of the fine chain 11 is hooked into one of the links of the side chain, as shown in Fig. 2, and the chain is securely held in position.

It is to be noted that the entire operation of applying my improved chain to the vehicle tire may be accomplished without moving the vehicle and without undue effort on the part of the operator, and without reaching through and over the wheel which makes the operation of putting on the ordinary chains a dirty and disagreeable job. The lever arm 8 of the fastening member is sufficiently long so that it easily spans the distance between adjacent ends of the side chain when the chain is draped loosely over the tire. I have found that the powerful lever action obtained when drawing the ends of the chain into operative position serves to easily and conveniently bring the free ends of the side chain to closely adjacent position even though the vehicle may be appreciably settled into muddy ground. Of course, the diagonal chain 7 cannot be brought into final position in this manner, but will lie closely along the point of contact of the tire with the solid ground upon which it is resting and will be distorted from its final position only a relatively small amount. When the vehicle is set in motion the diagonal chain 7 will assume a true position extending over the top of the tire and will introduce no appreciable slack in the chain.

I preferably employ a single diagonal chain 7, as shown in Fig. 3, but I may also employ a pair of such chains in the manner as shown in Fig. 4. Each end of the side chain 1 is provided with an extension 7′ and the ends of the side chain 2 extend equal distances beyond the lowest cross chains 4, so that when the chain is laid out flat, as shown in Fig. 4, each of the diagonal chains 7′ forms the hypothenuse of the right triangles whose sides consist of cross chains 4 and the extensions of the side chains 2. The application of this chain to the tire is accomplished in substantially the same manner as has been described, the fastening member 8 being applied between the apexes of the two right triangles of which the diagonal chains 7′ form the diagonal sides.

I have illustrated and described my preferred embodiments of the invention, but it is to be understood that various changes may be made within the full scope of the appended claims. The lever 8, although it provides an easy means of securing the chain in place, may be dispensed with and a fastener of the ordinary type used instead. Likewise, the forming of the various chain extensions may be accomplished by an essentially unified structure or by means of separate lengths of chain riveted or otherwise secured in proper place, and other similar changes may be made.

I claim:

1. A tire chain comprising two side chains, a plurality of cross chains, a chain substantially longer than said cross chains extending diagonally from one side chain to the other and permanently associated therewith, said side chains being broken at substantially their points of intersection with the diagonal chain, and means for creating a tension between the free ends of the tire chain and locking said chain in operative position.

2. A tire chain comprising two side chains, a plurality of cross chains, a chain substantially longer than said cross chains extending diagonally from one side chain to the other and permanently associated therewith, said side chains being broken at substantially their intersection with the diagonal chain, a ring at one end of one of said side chains, an extension provided at the other end of said side chain of such size as to pass readily through said ring, a hook carried by said extension for engagement with said side chain, and means for locking the free ends of the other side chain in position.

3. A tire chain comprising two side chains, a plurality of cross chains, a chain substantially longer than said cross chains extending diagonally from one side chain to the other, said side chains being broken at a portion of their lengths, means provided at one end of one of the said chains for creating a tension between the free ends of said chain to bring said diagonal chain into its operative position bridging a gap substantially greater than that between the two consecutive cross chains, and means for locking the ends of both side chains in position.

4. A tire chain comprising two side chains, a plurality of transverse chains having their ends attached to the side chains at substantially equally spaced intervals, and a diagonal chain adjacent one end of the said side chains, said diagonal chain having its opposite ends attached to the side chains, the lengths of side chain between the points of attachment of the diagonal chain and the adjacent transverse chain being greater in one side chain than in the other.

5. A tire chain comprising two side chains, a plurality of transverse chains having their ends connected to said side chains at substantially equally spaced intervals throughout the greater part of the length of said chains and a diagonal chain adjacent one end of the said side chains, said diagonal chain extending from one side chain adjacent the point of attachment of the adjacent cross chain to a point on the other side chain at a substantial distance from the point of attachment of said transverse chain, and attaching means for securing said chain on the wheel with one end of said diagonal chain to the rear of the point of contact of the tire and the ground and with the other end of said chain in front of such point.

6. A tire chain comprising two side chains, a plurality of transverse chains having their ends connected to said side chains at substantially equally spaced intervals throughout the greater part of the length of said chains and a diagonal chain adjacent one end of the said side chains, said diagonal chain extending from one side chain adjacent the point of attachment of the adjacent cross chain to a point on the other side chain at a substantial distance from the point of attachment of said transverse chain, and attaching means for securing said chain on the wheel, said attaching means being located at different points in the respective side chains.

In testimony hereof I affix my signature.

FREDERICK TAYLOR GAUSE.